July 12, 1927.
G. F. RATHBUN
1,635,767
ROTARY VALVE
Filed Dec. 29, 1924
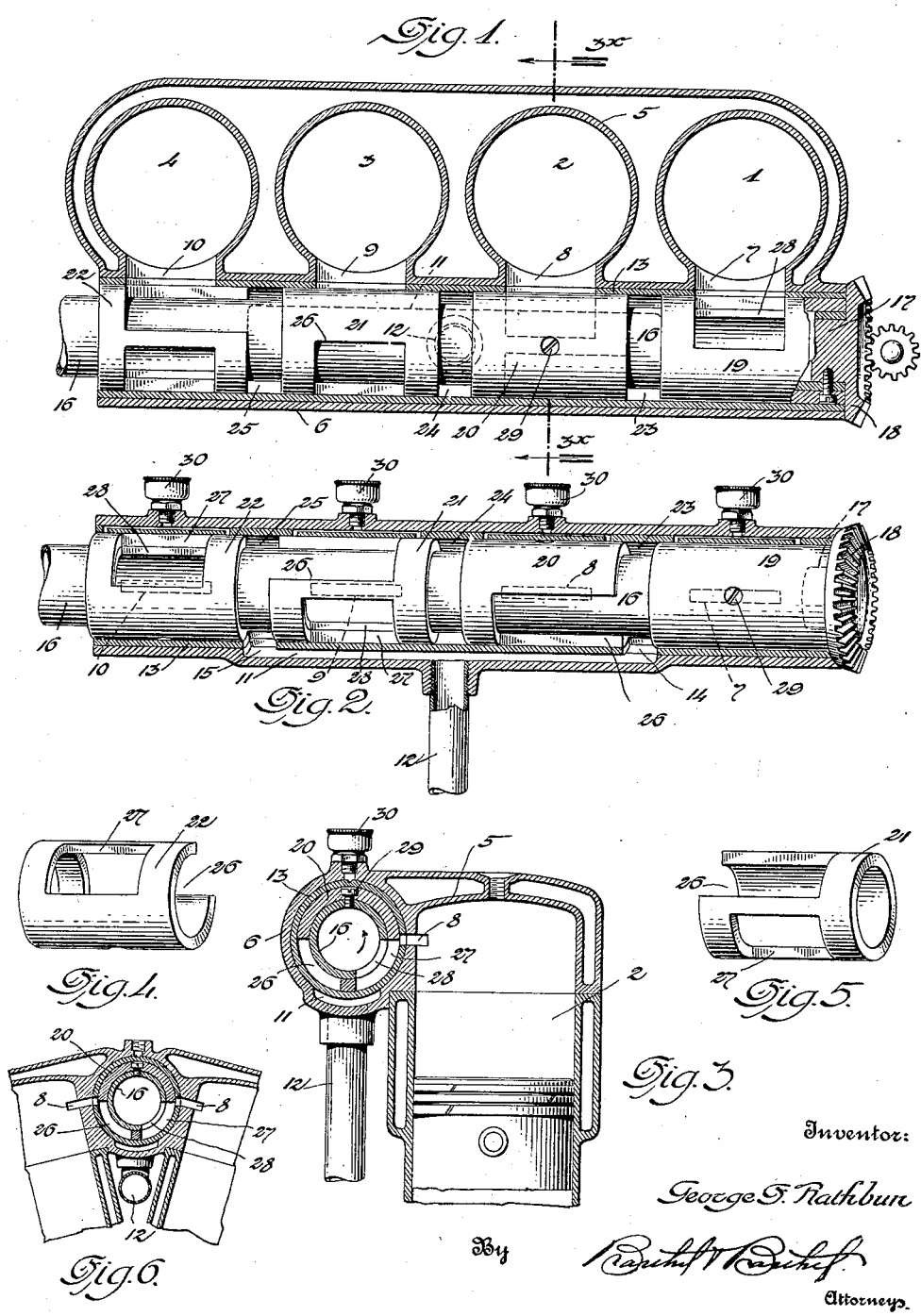
Inventor:
George F. Rathbun
By
Attorneys Patented July 12, 1927.

1,635,767

UNITED STATES PATENT OFFICE.

GEORGE F. RATHBUN, OF PONTIAC, MICHIGAN.

ROTARY VALVE.

Application filed December 29, 1924. Serial No. 758,642.

This invention relates to rotary valves for internal combustion engines, for which purpose rotary valves have been often hereto suggested but have usually been of such nature that their production was expensive or their construction unduly complicated.

This invention has for its object to provide a form of rotary valve which may be cheaply constructed and which is of simple form, enabling it to be readily adapted to an engine without great expense, the said valve by its substitution for puppet valves such as are usually used in internal combustion engines, enabling a large number of moving parts to be dispensed with, and eliminating the necessity of effecting fine and frequent adjustment of parts which is one of the disadvantages of the puppet valve construction.

The said invention also has as an important object, the provision of simple interchangeable elements which when assembled together in various relative arrangements according to requirements result in the production of a rotary valve which may be adapted to the needs of various types of engines and different numbers and arrangement of cylinders.

The said invention still further aims to provide in a rotary valve for the effectual utilization of exhaust passages therein for the preheating of inlet gases, and the said invention still further has as its object to provide a built up rotary valve wherein passages are formed by the relative disposition of parts of the valve and the necessity of machining such passages is avoided.

Still further objects subsidiary to or resulting from the aforesaid objects, or from the construction or operation of the invention as it may be carried into effect, will become apparent as the said invention is hereinafter further disclosed.

In carrying the said invention into effect, I may provide a tubular casing having a plurality of ports, each of which communicates with an engine cylinder for inlet and exhaust purposes, a rotary valve in said casing, said rotary valve comprising a central tube of substantially smaller outside diameter than the bore of said casing, and sleeves or castings equal in number to said ports, said sleeves being mounted upon and occupying the space between said tube and said casing, the said sleeves being relatively spaced along said tube to form inlet passages therebetween, and longitudinally slotted to provide communication between said passages and said ports when the said sleeves are rotated by the tube to required positions. The sleeves and said tube are also provided with coinciding ports therethrough to permit passage of exhaust gases into and through the said tube. The said sleeves are removable and interchangeable, permitting the building up of a valve to suit various numbers and dispositions of cylinders, and may be secured with their ports in any desired relative arrangement circumferentially of the tube according to required timing of the valves.

All of which is more particularly described and ascertained hereinafter, by way of example, having reference to the accompanying drawing, wherein—

Figure 1 is a horizontal section through the cylinders and valve casing of an engine, illustrating in plan and partly in section a rotary valve embodying the said invention;

Figure 2 is a vertical section through the valve casing, illustrating in perspective the said valve;

Figure 3 is a transverse section taken on the line 3×—3×, Figure 1;

Figure 4 is a detail perspective view of one of the sleeves removed;

Figure 5 is a similar view to Figure 4, illustrating another of the said sleeves; and Figure 6 illustrates a modified application of the valve.

Similar characters of reference indicate similar parts in the several figures of the drawing.

1, 2, 3 and 4 indicate the cylinders of an engine surmounted by a cylinder head casting 5 which also has formed integral therewith a tubular valve casing 6, communication between the bore of said valve casing and the said cylinders being effected by parts 7, 8, 9 and 10.

The lower part of the valve casing 6 is provided with an elongated passage 11 with which an inlet pipe 12 communicates, and 13 is a tubular liner inserted in the said valve casing and provided with inlet ports 14 and 15. Passing through the said casing and of substantially smaller diameter than said liner is a tube 16, one end of which receives and is closed by the boss 17 of a gear 18 adapted to be driven in any suitable manner to effect the rotation of the said tube 16.

Ordinarily in rotary valve construction the tube 16 is of the same size as the bore of the valve casing and is provided with a complicated system of slots, openings, passages or depressions, or its place is taken by a solid bar machined to provide a complicated arrangement of passages therein. These constructions are expensive and not readily provided, neither do they lend themselves to variation of port arrangements so that they may be adapted without very much trouble to different types or designs of engines.

In the present arrangement, the said tube 16 is provided with sleeves 19, 20, 21 and 22, corresponding in number to the number of cylinders and located across the ports thereof, the said sleeves being of sufficient thickness to take up the space between the said tube 16 and the liner 13 so that they have a smooth rotatable working fit therein and the said sleeves are further spaced from one another to provide annular passages 23, 24 and 25 therebetween, the said passages 23 and 25 being in juxtaposition with the inlet ports 14 and 15 of the liner 13.

Each of the said sleeves is provided with a slot 26 extending lengthwise from one end thereof and communicating with the passage 23 or 25 as the case may be, the said sleeves being also provided with ports 27 coinciding with similar ports 28 in the said tube 16. The disposition of the said recesses 27 and 26 respectively is such that upon rotation of the valve they will consecutively be brought into communication with the ports 7, 8, 9 or 10 of the cylinders, the ports 28 permitting the said cylinders to exhaust into the tube 16 and the ports 27 permitting the passage of inlet gases from the passages 23 and 25 to the said cylinders. Obviously, according to the timing of the explosions in the said cylinders, the ports and passages of the said sleeves will be required to communicate with their respective cylinders at different intervals of the rotation of the valve, and this is determined simply by the rotary adjustment of the sleeves on the tube 16 when assembling the valves to their various relative positions required, 29 being set screws by means of which the said sleeves are secured in their adjusted positions.

Practically all of the machine work that is required on the tube 16 to adapt it to any valve arrangement, is simply the cutting of the ports 28 in the positions necessary to suit such arrangement. The recesses and ports 26 and 27 may be formed in the sleeves when they are cast and no special machining operations on these sleeves may be required other than the machining of the inner and outer surfaces thereof which is quite simple. The passages 23 and 25, of course, do not require to be machined, being simply formed by the sleeves, and it will therefore be apparent that the work entailed in the construction of a valve such as that described is not extensive.

The exhaust gases that pass through the tube 16 serve effectively to preheat the inlet gases in the passages 11, 23 and 25 so that an appreciable quantity of hot gas is always available during the operation of the engine for entrance into each cylinder as the piston thereof commences its inlet stroke.

The passage 24 may be utilized for the containing of grease or other packing if desired, and grease cups 30 may be also utilized for the lubrication of the sleeves if thought necessary or desirable.

It will also be seen that the sleeves 20 and 22 are of the same construction and are interchangeable, the sleeves 19 and 21 being also interchangeable and only differing from the other sleeves 20 and 22 in that the inlet passages 26 open from the opposite end of the sleeve; and these sleeves may be very cheaply constructed in large quantities and held in stock for assembling in any required number and disposition on exhaust tubes, similar to 16, according to requirements.

Furthermore, in an arrangement such as that described, a large exhaust passage is permissible without creating a complicated system of passages leading thereto, so that power in the engine is maintained due to the great freedom with which the exhaust gases may be disposed of. The arrangement also admits of the cylinder ports being of substantial area.

It is further apparent that a valve of this type, due to the fact that it may operate in conjunction with cylinder ports of elongated form having substantial capacity, is capable of quick opening and closing, and also owing to the substantial area of the valve existing between the closing edge of the inlet passage of the valve and the leading or opening edge of the exhaust port thereof, substantial sealing of the valve is secured during compression and firing with consequent conservation of power.

The valve may further be used for the common operation of a pair of cylinders such as in the manner illustrated in Figure 6.

This invention may be developed within the scope of the following claims without departing from the essential features of the said invention, and it is desired that the specification and drawing be read as merely illustrative and not in a limiting sense, except as necessitated by the prior art.

What I claim is:—

1. In an internal combustion engine, a valve casing, a plurality of cylinders each having a single port communicating with said casing, a rotary exhaust pipe within said casing, and a plurality of valves in the form of sleeves adjustably fitted on said pipe and associated with each of said ports, said sleeves being spaced endwise on said pipe whereby inlet passages are provided therebetween, said sleeves having inlet ports communicating with said passages, and said sleeves and said pipe having coinciding exhaust ports therein.

2. A rotary valve for internal combustion engines, formed by sliding cast sleeves provided with inlet and exhaust ports therein on to a tube, adjusting said sleeves longitudinally to suit any desired cylinder arrangement and in a rotary manner to suit any relative port arrangement, perforating the tube to coincide with required positions of the exhaust ports of said sleeves at any time after said positions have been determined, and securing said sleeves in positions of adjustment on said sleeve.

3. A rotary valve comprising an exhaust pipe, a plurality of separate sleeve valves fitted over said pipe, means for adjusting said valves longitudinally and circumferentially with respect to said pipe, said valves being adapted to convey fuel mixture to adjacent cylinder ports, said pipe and valves having coinciding recesses whereby to convey exhaust gas from adjacent cylinder ports to said exhaust pipe.

4. A rotary valve comprising a valve casing adapted to communicate with a plurality of cylinder ports, a rotary exhaust pipe within said casing, and a plurality of valves in the form of sleeves adjustably fitted on said pipe and disposed adjacent said ports, said sleeves being spaced endwise on said pipe whereby inlet passages are provided therebetween, said sleeves having inlet ports communicating with said passages, and said sleeves and said pipe having coinciding exhaust ports therein.

In testimony whereof I affix my signature.

GEORGE F. RATHBUN.